June 18, 1957 J. H. DAHLBERG 2,795,815
POULTRY DRESSING MACHINE
Filed Oct. 2, 1953 7 Sheets-Sheet 1
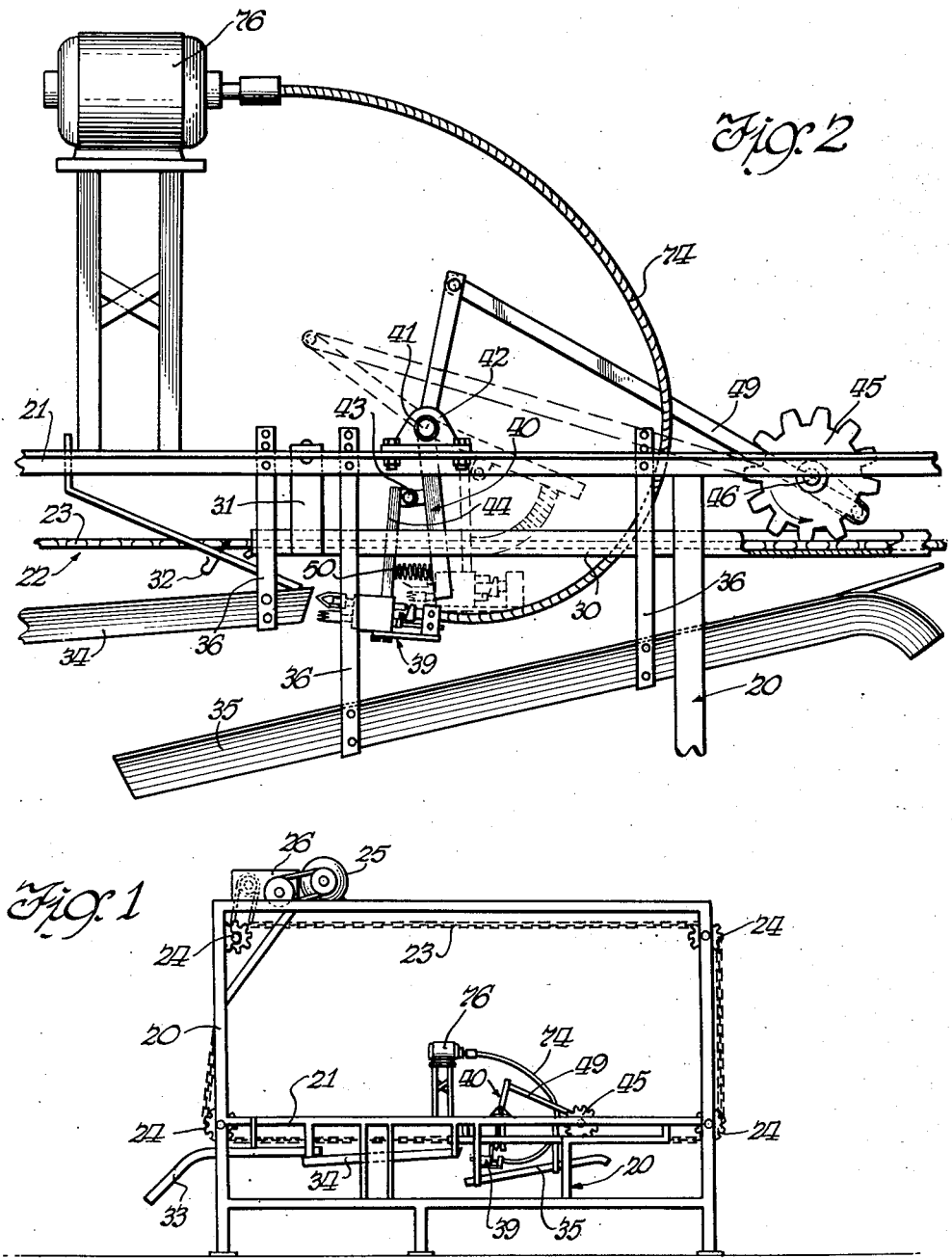
Inventor
J. Herman Dahlberg
by Fidler, Conner & Bradley
Attys.

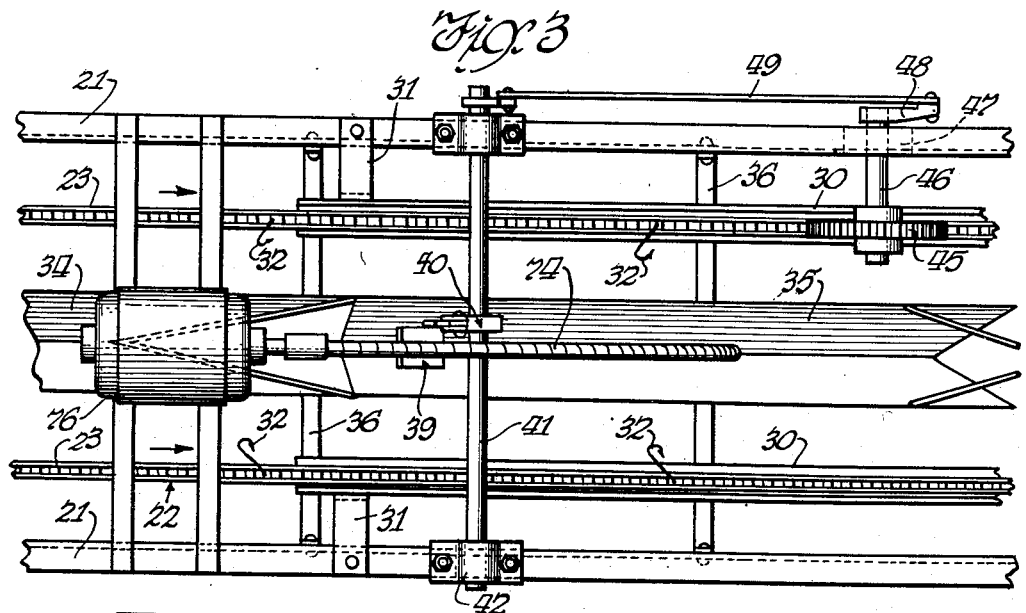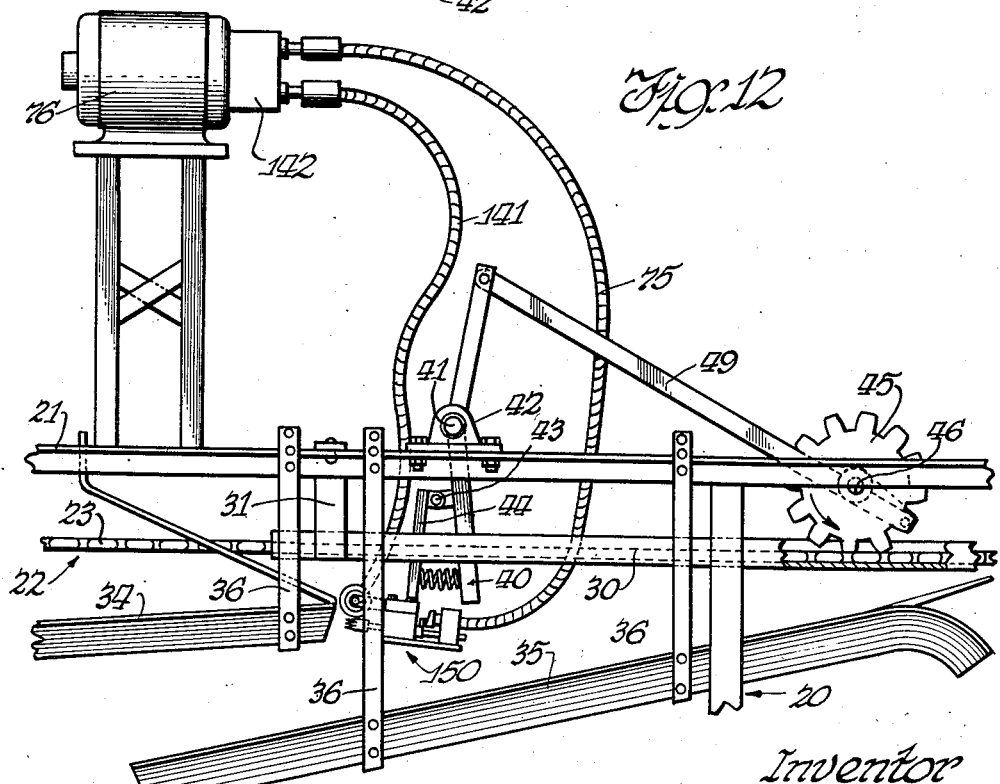

June 18, 1957
J. H. DAHLBERG
2,795,815
POULTRY DRESSING MACHINE
Filed Oct. 2, 1953
7 Sheets-Sheet 3
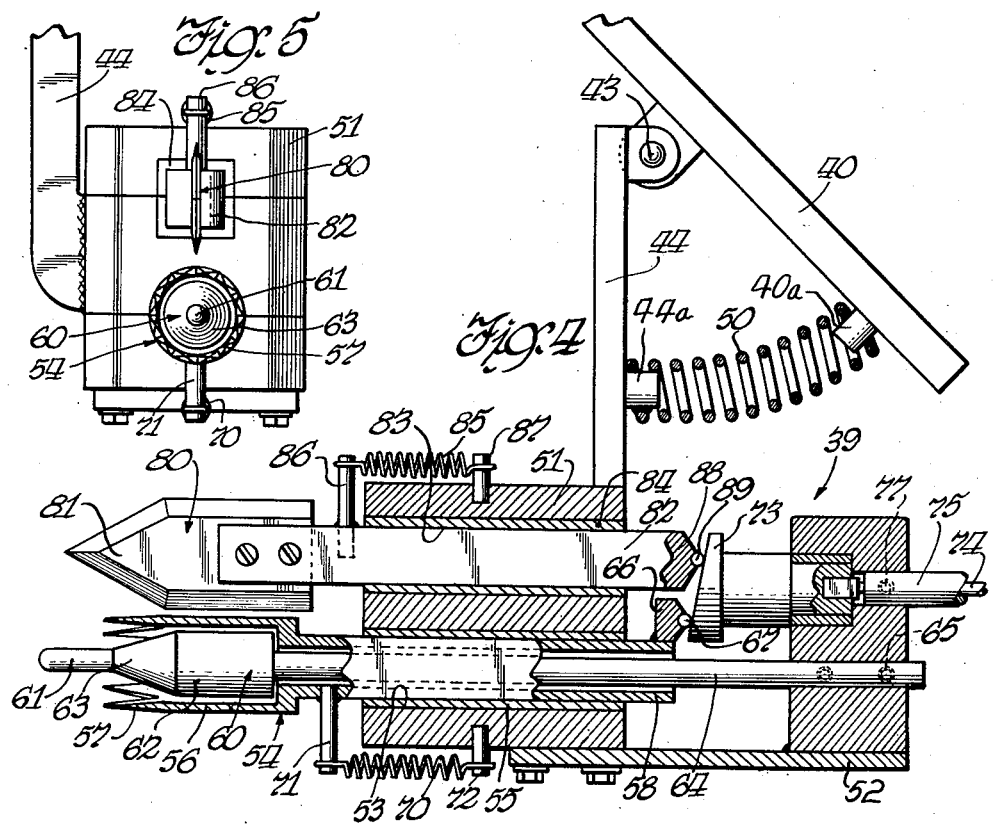
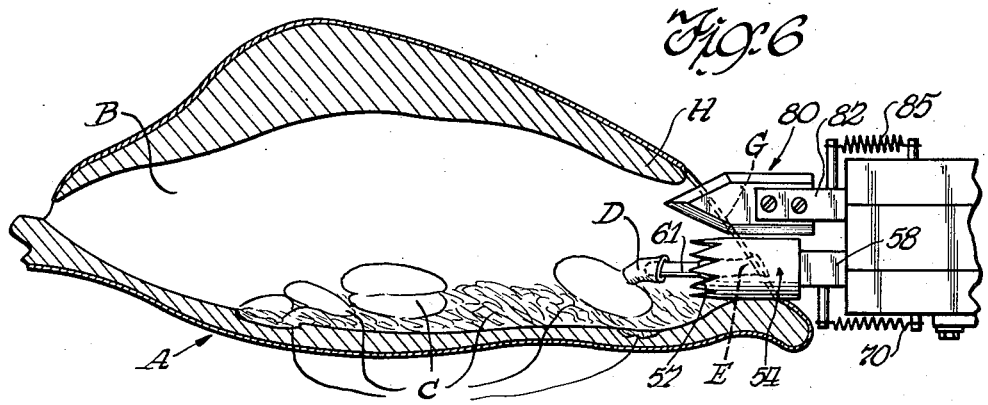
Inventor
J. Herman Dahlberg
by Fidler, Crouse & Beardsley
Attys.

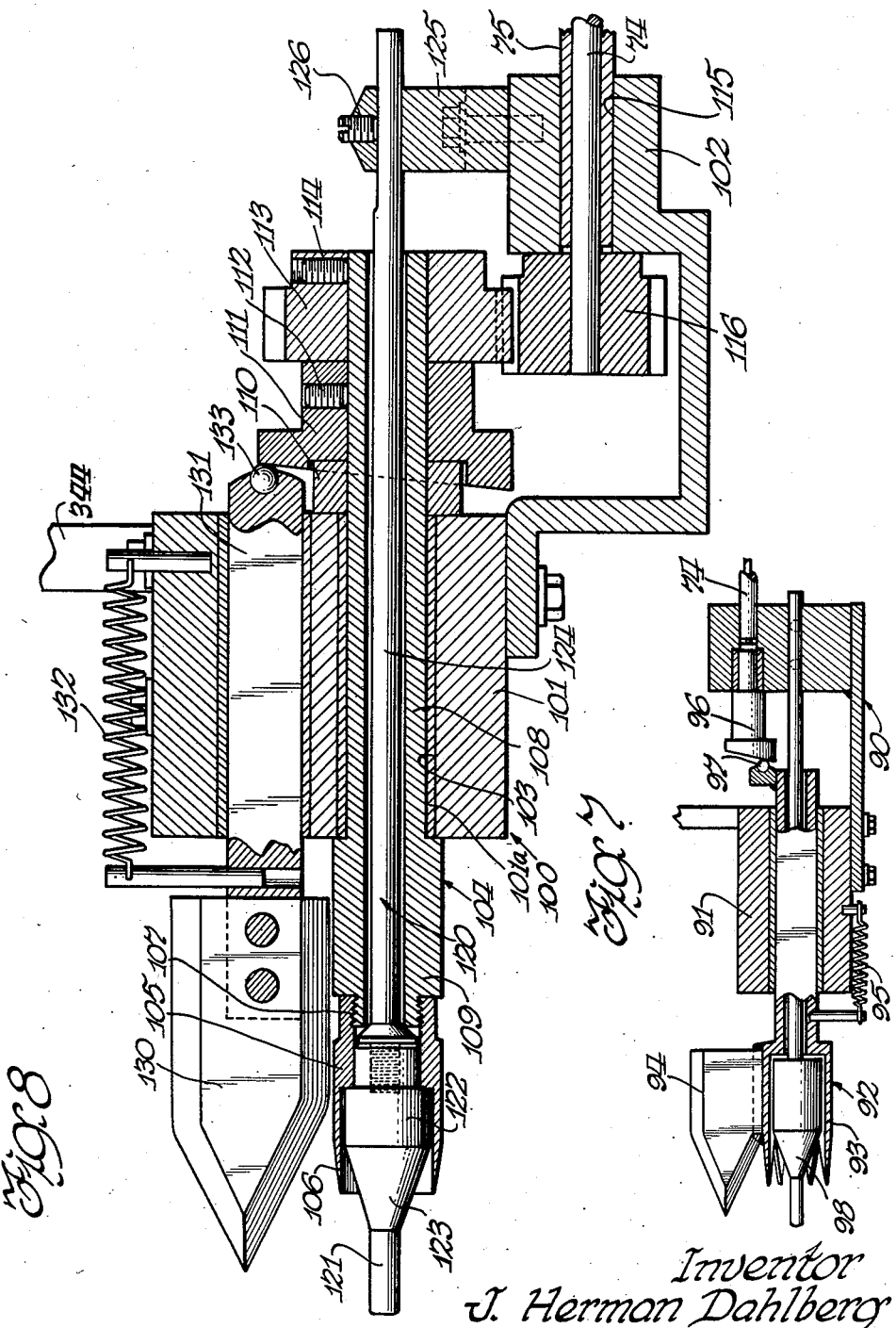

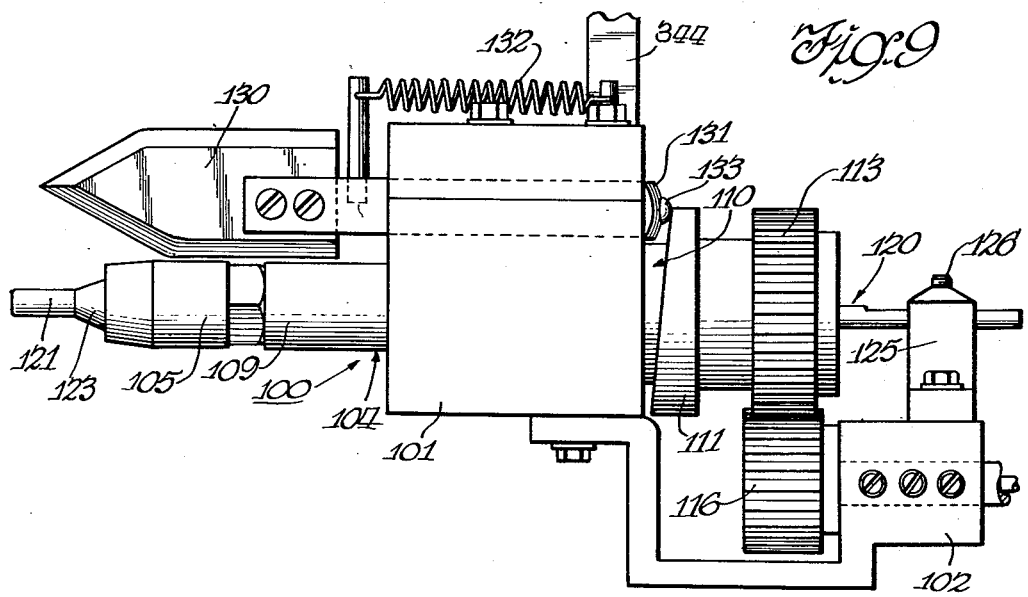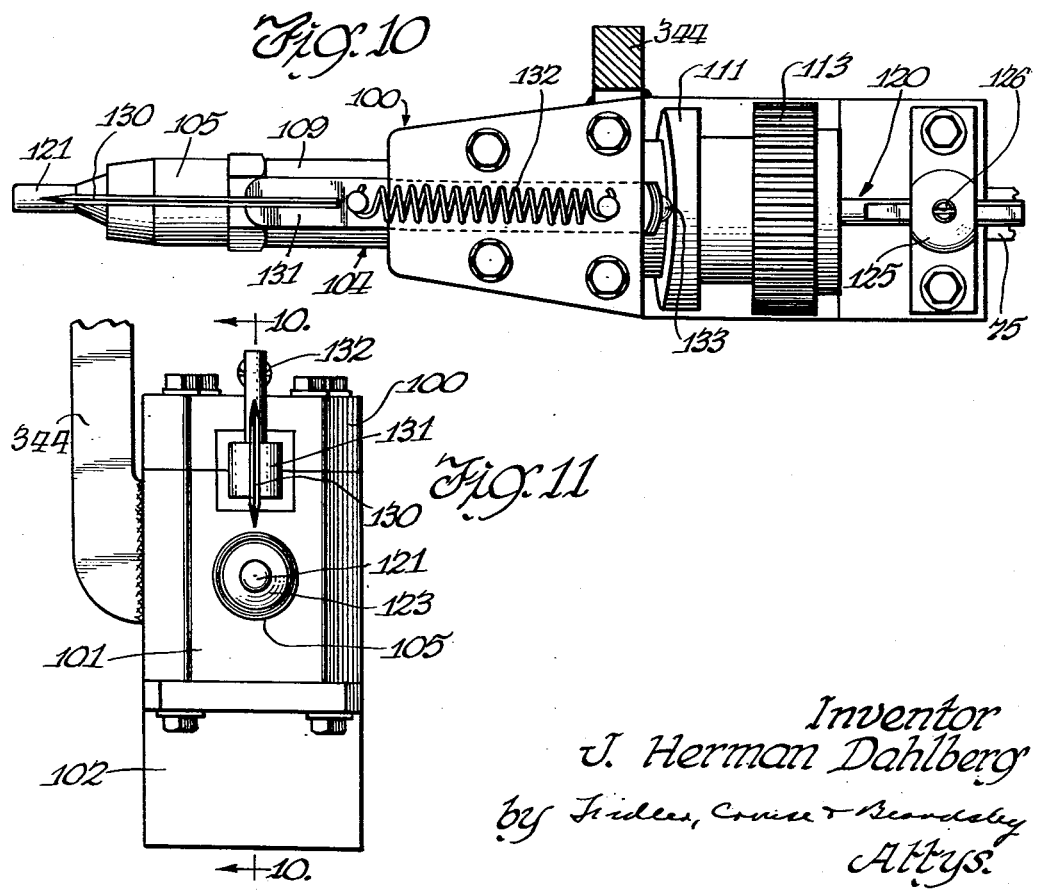

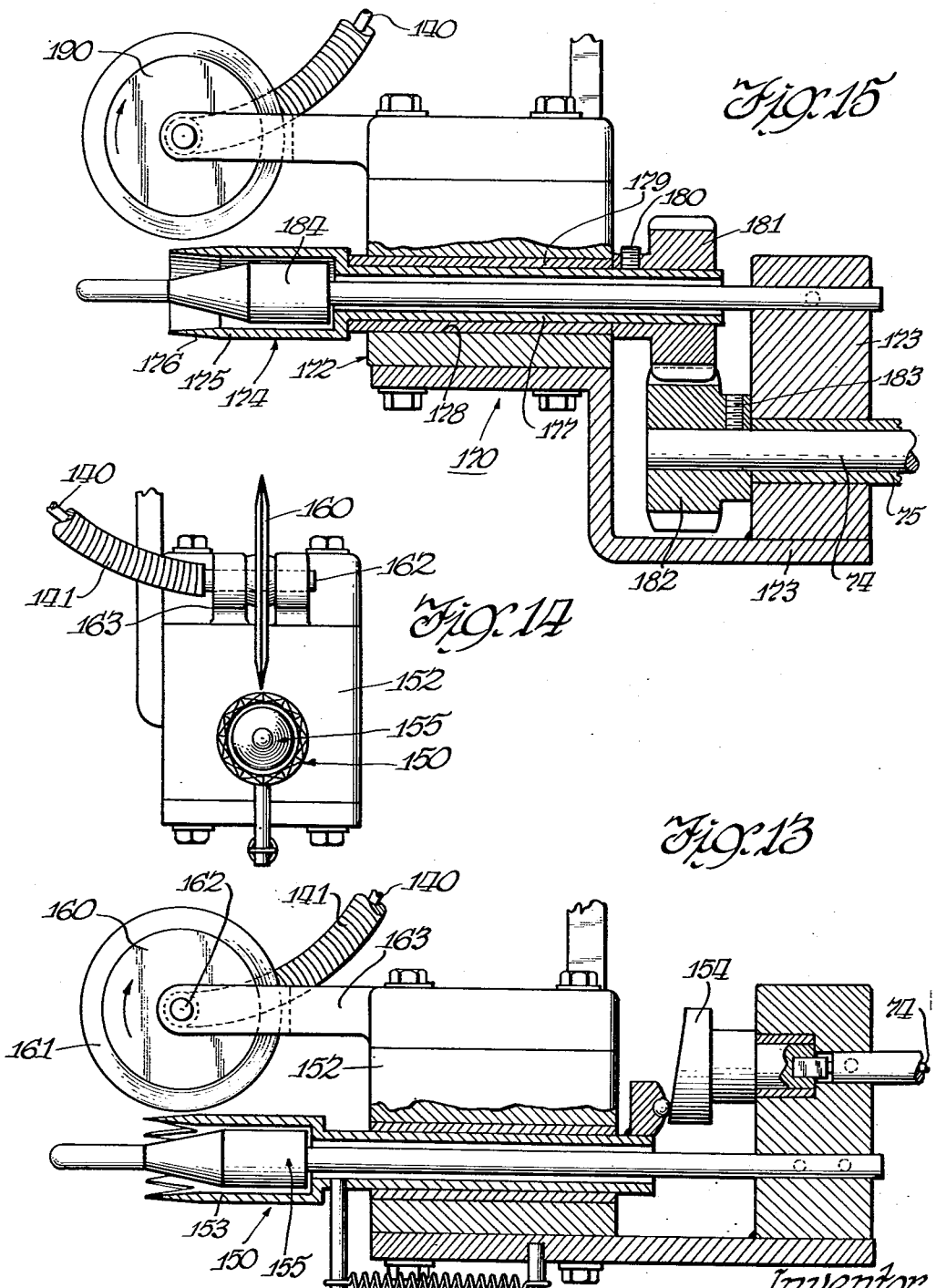

June 18, 1957 J. H. DAHLBERG 2,795,815
POULTRY DRESSING MACHINE
Filed Oct. 2, 1953 7 Sheets-Sheet 7
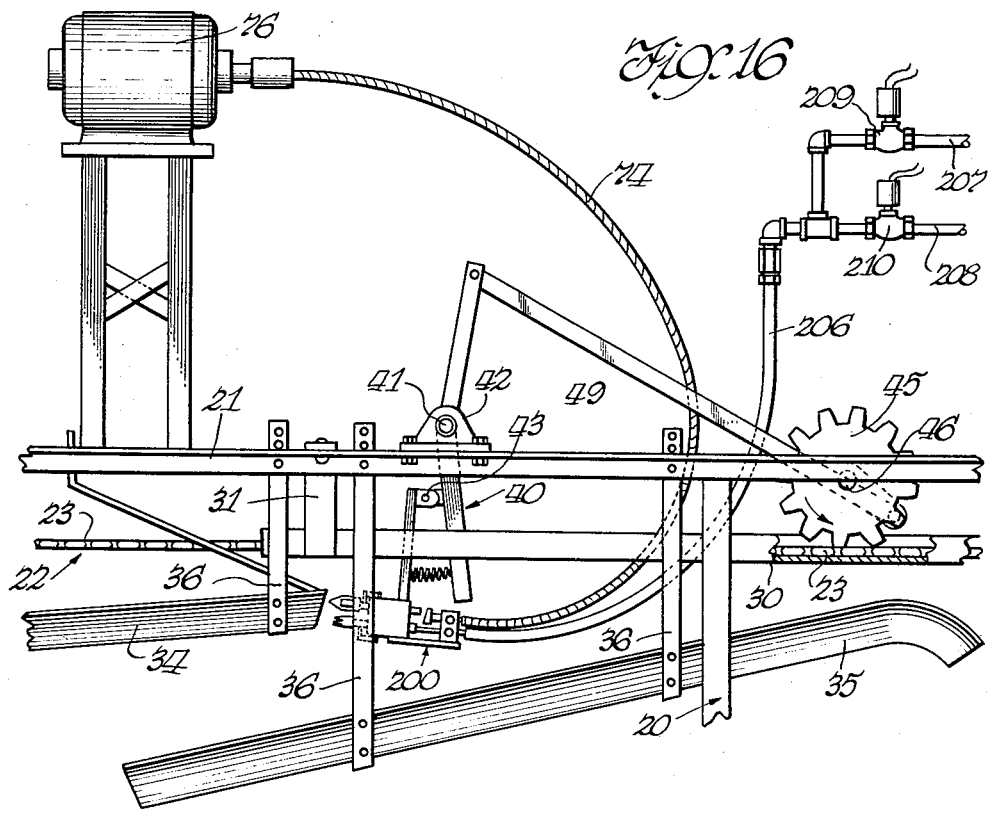
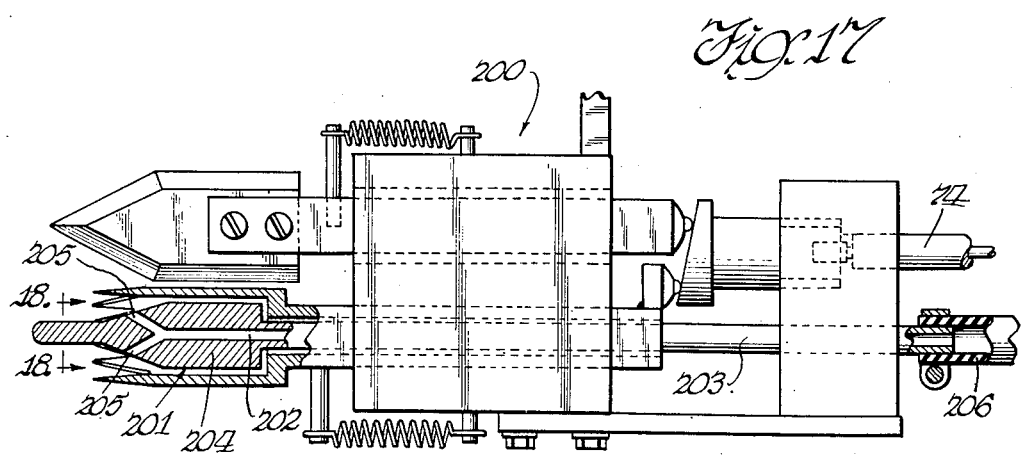
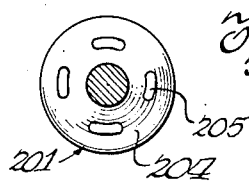
Inventor
J. Herman Dahlberg
Attys.

United States Patent Office 2,795,815
Patented June 18, 1957

2,795,815

POULTRY DRESSING MACHINE

John Herman Dahlberg, Omaha, Nebr., assignor to C. A. Swanson & Sons, Omaha, Nebr., a corporation of Nebraska Application October 2, 1953, Serial No. 383,743

16 Claims. (Cl. 17—11)

This invention relates to the evisceration of poultry and has to do particularly with a machine for venting poultry carcasses. It also relates to a machine for venting poultry carcasses and splitting the abdominal skin between the vent and the keel bone.

In the evisceration of poultry carcasses an important operation is that known as "venting" wherein a generally circular cut is made in the abdominal skin in order to sever the rectum or "vent," where the large intestine of the bird terminates, from the surrounding skin, in order to separate the vent and the large intestine from the surrounding skin to permit removal of the vent and intestine along with the remaining viscera, and to provide access into the visceral cavity. To further provide access to the visceral cavity the abdominal skin is cut longitudinally or split from the vent cut to adjacent the keel bone.

Venting customarily has been performed heretofore by a manual operation in which the operator grasps the fowl carcass in a manner which brings the rear of the carcass in full view of the operator. The operator then inserts a sharp pointed knife into the skin adjacent the vent in such manner that the knife will enter the carcass parallel to the large intestine and guides the knife in a circular cut around the vent and large intestine so as to sever the skin around the vent but not to sever the intestine. It will be understood that the large intestine contains the excretion from the digestive process of the fowl and if the large intestine were severed such excretion would come into contact with the edible portions of the carcass and would therefore create an unsanitary condition which would require special attention for the completion of the processing operation, namely the washing away of the excretion and sometimes the cutting away of a portion of the carcass, especially where the excretion has come into contact with open and exposed edible tissues.

The manual operation for making the vent cut, that is the cut around the large intestine, often results in the large intestine being severed, especially where the operator is relatively inexperienced. Therefore it is often the case that substantial extra work and loss of time result, causing the venting operation to be a relatively costly one.

It has long been the desire of the poultry industry to provide a mechanical venting operation which would satisfactorily perform the cutting operation without attendant disadvantages accompanying the manual operation.

An object of the present invention is to provide novel apparatus for venting poultry carcasses.

Another object is to provide an apparatus for venting and splitting the abdominal skin of poultry carcasses between the vent and the keel bone.

A further object is to provide an apparatus for venting poultry carcasses wherein the vent is cut away from the adjacent skin in such manner that neither the vent nor the adjacent portion of the large intestine are cut into or otherwise damaged.

A further object is to provide an apparatus for venting poultry carcasses wherein the vent and adjacent portion of the large intestine are held in predetermined position and the vent is cut away from the adjacent skin without cutting into or otherwise damaging either the vent or the adjacent portion of the large intestine.

Another object is to provide apparatus for automatically venting poultry carcasses.

Another object is to provide apparatus for automatically venting poultry carcasses and splitting the abdominal skin between the vent and the keel bone.

Another object is to provide apparatus for automatically venting poultry carcasses and splitting the abdominal skin between the vent and the keel bone without cutting into or in any way damaging the viscera.

Another object is to provide apparatus for venting poultry carcasses and for splitting the abdominal skin between the vent and the keel bone which apparatus is simple and inexpensive to build, is effective in operation, may be operated by relatively unskilled persons and requires a minimum of attention, servicing, repair and replacement of parts.

Other objects and advantages of the invention will appear from the following description taken in connection with the appended drawings wherein:

Figure 1 is a somewhat diagrammatic side elevational view of a preferred form of apparatus constructed in accordance with the present invention;

Fig. 2 is an enlarged, fragmentary, side elevational view of a portion of the structure of Fig. 1;

Fig. 3 is a top plan view of the apparatus of Fig. 2;

Fig. 4 is an enlarged fragmentary, vertical sectional view through the cutter mechanism of Fig. 1;

Fig. 5 is an end elevational view of the cutter mechanism of Fig. 4;

Fig. 6 is a somewhat diagrammatic view showing a portion of the cutter mechanism of Fig. 4 in cutting relation to a fowl carcass;

Fig. 7 is a view similar to Fig. 4 only showing another form of cutter mechanism;

Fig. 8 is an enlarged, vertical sectional view of another form of cutter mechanism which may be substituted for the cutter mechanism shown in Fig. 1;

Fig. 9 is a reduced side elevational view of the mechanism of Fig. 8;

Fig. 10 is a top plan view of the cutter mechanism of Fig. 8;

Fig. 11 is an end elevational view of the cutter mechanism of Fig. 8;

Fig. 12 is a view similar to Fig. 2 only showing another form of the invention;

Fig. 13 is an enlarged fragmentary side elevational view, partially in cross section, showing the cutter mechanism of Fig. 12;

Fig. 14 is an end elevational view of the cutter mechanism of Fig. 13;

Fig. 15 is a side elevational view, partially in cross section, of a cutter mechanism which may be substituted for the cutter mechanism shown in Fig. 11;

Fig. 16 is a view similar to Fig. 2 showing another form of the apparatus;

Fig. 17 is an enlarged fragmentary elevational view, partially in cross section, showing the cutter mechanism of Fig. 16; and Fig. 18 is an enlarged cross-sectional view taken along line 18—18 of Fig. 17.

The machine in accordance with the present invention is constructed for automatic operation. That is to say, the machine includes mechanism for performing the venting operation and the abdominal splitting operation, and mechanism for conveying the fowl carcasses successively past the venting and splitting mechanism and for guiding the carcasses into operative relation with the venting and splitting mechanism so that no manual operations are required. However, it will be understood that if it should be desired so to do, the fowl carcasses may be brought into cutting relation with the venting and splitting mechanism manually and without the use of any conveying mechanism.

The machine of the present invention is particularly well adapted for incorporation in, and as a component portion of, an eviscerating machine embodying mechanisms for performing other eviscerating operations. For example, the machine of the present invention may, if desired, be incorporated in an eviscerating machine which includes a machine for splitting the breast of the fowl carcass. The aforesaid breast-splitting mechanism may be disposed either ahead of or following the mechanism of the present invention, although I prefer to locate it following the present mechanism so that the venting and splitting operations are performed prior to the breast-splitting operation. Thus, the breast-splitting operation may be accomplished with somewhat more facility than where that operation is performed prior to the venting and splitting of the abdominal skin.

Referring now particularly to Figs. 1 to 3 of the drawings, the machine includes a suitable frame 20 on which the several operating members are supported. The machine may be entirely self-contained or it may be formed as a portion of a machine (not shown) embodying other eviscerating mechanisms. The frame 20 includes a pair of side rails 21 suitably supported and which serve as principal supporting members for the venting and splitting mechanism and several associated elements of the machine hereinafter described.

A traveling conveyor 22 is provided for advancing poultry carcasses successively in spaced relation past the venting and splitting mechanism. The conveyor includes a pair of spaced endless chains 23 which are trained around sprockets 24 and are driven by a suitable driving means such as a motor 25 connected through a drive 26 to one of the sprockets 24. The chains 23 are supported and guided by spaced guides 30 of angular, cross-sectional shape which are suitably positioned rigidly as by straps 31 secured to and depending from the rails 21.

The chains 23 carry at spaced locations therealong paired hooks or shackles 32 adapted to receive and hold the legs of the poultry carcass for advancing the carcass along the path of movement of the conveyor. To this end, the hooks of each pair are disposed in lateral alignment as will be seen in Fig. 3 of the drawings. Disposed below and extending along the conveyor 22 is a guide which includes a plurality of guide members 33, 34 and 35 of generally V-shaped cross section. The guide members 33, 34 and 35 are disposed with their center lines in a longitudinal plane passing medially between the two chains 23 and are so arranged as to guide the fowl carcass into position for the venting and splitting operation and then to allow it to fall away from the venting and splitting mechanism so that the carcass is not damaged by the venting and splitting mechanism as it is moved past and under the latter, as will hereinafter more fully appear.

The venting and splitting or cutter mechanism 39 hereinafter more fully described in detail is supported for movement into position to be engaged by a fowl carcass as the latter is advanced by the conveyor 22 and for movement out of the path of movement of the carcass after the venting and splitting operations have been performed so as to prevent damage to the carcass. To this end a suspension arm 40 is pivotally mounted on the frame as by a shaft 41 journaled in bearings 42 supported on the rails 21. The cutter mechanism 39 is pivotally connected to the arm 40, as at 43, by a bar 44 upstanding from and forming a portion of the venting and splitting mechanism.

The arm 40 is adapted to be rocked between two extreme positions, indicated respectively in Fig. 2 by the full lines and the broken lines. This preferably is accomplished by a bell crank mechanism including a driving sprocket 45 carried on a stub shaft 46 journaled in a bearing 47 in one of the side rails 21. Secured to the shaft 46 at its outer end is a crank 48 which is connected by a pitman 49 to the suspension arm 40. The sprocket 45 is driven in timed relation to the movement of the conveyor 22 and preferably is driven directly by one of the chains 23.

When the sprocket 45 is rotated it rocks the suspension arm 40 between its two extreme positions and accordingly moves the cutter mechanism 39 between its two aforementioned positions. It will be noted that since the cutter mechanism 39 is pivotally connected to the suspension arm 40 it remains in more or less upright position and does not rock to the same extent as the suspension arm 40. However, when the suspension arm 40 is in its substantially vertical (full line) position it serves as a back stop or support for the cutter mechanism 39 to limit the displacement caused by engagement between the cutter mechanism 39 and the fowl carcass.

The cutter mechanism 39 is resiliently and yieldably positioned away from the suspension arm 40 by a coil spring 50 which extends between and is secured to the lower portion of the suspension arm 40 and the corresponding portion of the bar 44 as shown more in detail in Fig. 4. The spring is engaged over studs 44a and 40a on the bar 44 and arm 40 which serve as limit stops to limit the approach movement of these members.

The cutter mechanism in accordance with the invention includes means for holding the vent and adjacent portion of the large intestine while the vent cut is made, means for performing the circular vent cut to sever the vent from the surrounding skin, and means for cutting or splitting the abdominal skin from the vent to the keel bone.

Referring now particularly to Figs. 4 and 5, the cutter mechanism 39 includes a frame or support to which the bar 44 above mentioned is secured and from which it upstands. The frame includes a principal block portion 51 and a rearwardly extending bracket portion 52 secured thereto in a suitable manner. The block 51 is provided with a cylindrical, longitudinally extending bore 53 adapted to receive a cutter blade 54 for sliding movement therein. Preferably, although not necessarily, the cutter blade 54 is supported in a bearing 55 fitted in the bore 53, although in certain cases the bearing may be omitted.

The cutter blade 54 has a cutter head 56 of cylindrical form which preferably is provided at its forward edge with deep V-shaped serrations forming elongated teeth 57. The portion of the head 56 in which the serrations are formed is tapered forwardly and sharpened and thus provides a knife-like cutting edge of generally circular form.

Extending rearwardly and in axial alignment with the head 56 is a tubular shank 58 which is slidably fitted in the bushing 55 and serves to guide the head for reciprocating, sliding movement in the block 51 by means hereinafter described.

Disposed with the cutter blade 54 is a probe 60 which includes a cylindrical nose or guide portion 61, a head or dilator 62 of greater diameter than the guide 61 and having a forward face 63 tapering to the diameter of the guide 61. The surface of the guide and dilator are smooth and preferably are polished. Secured to and extending rearwardly of the head 62 is a stem or shank 64 which extends through the shank 58 of the cutter blade and is secured at its rear end fixedly in the bracket 52 as by one or more screws 65. The head or dilator 62 is of a diameter somewhat less than the internal diameter of the head 56 for a purpose which will hereinafter appear and the tapered end of the head 62 terminates approximately at the forward, free edge of the cutter blade 54. The probe shank 64 is of such diameter as to provide clearance between it and the internal diameter of the cutter blade shank 58.

Fixedly secured to the rear end of shank 58 is a bearing which preferably includes a bearing seat element 66 and a bearing 67 carried therein and which may be a ball bearing. The cutter blade 54 is yieldingly and resiliently urged rearwardly by a spring 70 suitably connected at its ends to the cutter blade 54 and the block 51, as by pins 72 and 71 fixed in the block 51, and blade shank 58, respectively. The cutter blade 54 is urged forwardly intermittently by a drive which includes a cam 73 journaled in the bracket 52 and having an inclined forward face bearing against the bearing 67. The cam is connected in driving relation to and is rotated by a flexible shaft 74 driven by a motor 76 (Fig. 2) suitably mounted on the frame of the machine. The flexible shaft 74 is enclosed in the usual flexible sheath 75 which is secured in the bracket as by a set screw 77. As the shaft 74 is rotated, it rotates the cam 73 to alternately urge the cutter blade 54 inwardly and then to release it for return by the spring 70, whereby a reciprocating motion is imparted to the cutter blade 54.

The cutter mechanism 39 also preferably includes a reciprocating cutter blade for cutting the abdominal skin of the fowl from the vent to adjacent the keel bone. To this end a cutter blade 80 is provided which is relatively thin and flat and generally planar in shape. The blade 80 is provided with a tapered forward point portion 81 and is sharpened to a knife edge on its upper, lower and forward edge portions. The blade 80 is carried by a stem or shank 82 which preferably is of square, cross-sectional shape, although it may be rectangular. The shank 82 is slidably fitted in a correspondingly shaped bore 83 in the block 51, a bearing 84 preferably being provided therefor. The bore 83 is disposed parallel to the bore 53 and is so arranged as to position the planar blade 80 above the cylindrical blade 54 and in a medial, longitudinal plane passing through the latter. The blade 80 is disposed adjacent the blade 54 but is displaced therefrom a distance sufficient to prevent interference with the cutting action of the latter.

The blade 80 is retracted in a manner generally similar to the blade 54 and to that end a spring 85 is provided which is connected at its ends to the shank 82 and to the block 51, as by pins 86 and 87.

The blade 80 is intermittently urged forwardly against the action of the spring 85 preferably by the same cam 73 which actuates the cylindrical blade 64. Accordingly, a bearing seat 88 is provided at the rear end of the shank 82 and a ball bearing 89 is disposed in the seat. Thus upon rotation of the cam 73, the planar blade 80 is reciprocated simultaneously with the cylindrical blade 54 although in the opposite direction; that is to say, owing to the shape of the arrangement of the cam relatively to the shank 58 and 82, the former is advanced while the latter is retracted, and vice versa.

The operation of the machine illustrated in Figs. 1 to 5 will now be described.

The conveyor driving motor 25 and the cutter driving motor 75 are energized to drive their respective mechanisms. A poultry carcass, after the feathers have been removed, is attached to the conveyor chains 23 by engaging the two legs of the carcass with two corresponding shackles or hooks 32, at the loading end (left hand side as viewed in Fig. 1) of the conveyor 22. Where the machine of the present invention forms a part of a machine having other mechanisms for performing prior operations, the carcass will already have been attached to the conveyor. The fowl carcass is advanced by the conveyor and is guided by the guides 33, 34 and 35. As the carcass moves into position to be engaged by the cutter mechanism 39, the sprocket 45, acting through the bell crank mechanism, will have moved the arm 40 into its upright (full line) position which moves the cutter mechanism 39 into position to be engaged by the fowl carcass. As the carcass reaches the end of the guide 34, the probe 61 enters the vent and the adjacent portion of the large intestine to accurately and securely position the vent and intestine for cutting. Upon further advancing movement of the carcass, the reciprocating cutter blade 54 cuts the skin surrounding the vent, without, however, cutting into the intestine or other viscera.

Simultaneously with the cutting of the skin surrounding the vent, the reciprocating blade 80 enters the skin which extends between the vent and the keel bone and cuts or splits this skin from the cut made by the vent cutter 54 substantially to the keel bone.

The bell crank mechanism is so timed that after the aforementioned cuts have been made and before either of the cutter blades can cut into any of the viscera, the cutter mechanism 39 is retracted and raised so as to clear the fowl carcass and permit the latter to pass under the cutter mechanism 39. Also it will be noted that the guide 34 terminates at a point forwardly of the foremost position of the cutter mechanism 39 and consequently spaced sufficiently from the retracted position of the latter, to permit the fowl carcass to fall away from the cutter mechanism and to pass under the latter so that there is no interference with the passage of the fowl carcass or damage thereto by unintended engagement between the carcass and any portion of the cutter mechanism 39.

For the purpose of aiding in an understanding of the manner in which the cutter mechanism engages a fowl carcass, a carcass is shown somewhat diagrammatically in Fig. 6, with the cutter mechanism being shown substantially in its position of maximum penetration into the fowl carcass. The carcass A is shown in longitudinal cross section, with visceral cavity b, containing viscera C, which include the large intestine D terminating in the vent E which is broken away and sectioned. The abdominal skin which closes the rear end of the visceral cavity b is indicated at G, both such skin and the vent E being shown (in broken lines) in their respective positions which they assume prior to entry of the cutter mechanism into the fowl carcass.

After the carcass passes the venting and splitting mechanism, it may be removed from the machine for further eviscerating operations or may be transported by the same conveyor to mechanism (not shown) for performing further operations thereon.

While I prefer to impart a reciprocating cutting motion to both the vent cutter blade 54 and the skin splitter blade 80, the blades may be actuated in other ways to perform the cutting operation, as hereinafter described more in detail. For example, the vent cutter may be rotated and the skin splitter reciprocated. On the other hand, both the vent cutter and the skin splitter may be rotated, in which case somewhat different forms of blades than those heretofore described are employed. I have also found that satisfactory results may be obtained by reciprocating the vent cutter and rotating the skin splitter.

Where a vibrating vent cutter is employed, it is possible to combine the vent cutter and skin splitter into a single, unitary structure in lieu of providing separately vibrating knives. A cutter mechanism embodying such a cutter is illustrated in Fig. 7 to which reference now is made. The cutter mechanism 90 preferably is generally similar to the cutter mechanism 39 except as will appear from the following description. The cutter mechanism 90 includes a frame having a block 91 in which a cutter blade 92 is slidably guided in a manner similar to the vent cutter 54 shown in Fig. 4. The cutter blade 92 includes a vent cutter portion 93 similar to the vent cutter 54 and a skin splitter portion 94 generally similar to the skin splitter 80 except that it is sharpened only at its upper and forward edges. The skin splitter 94 is integral with the vent cutter 93 and extends in the medial, longitudinal plane of the vent cutter portion and directly above the latter. While the vent cutter portion 93 and the skin splitter portion 94 may be formed integral, it is usually preferable to form them separately and then unite them as by welding.

The cutter 92 is urged rearwardly by a spring 95 and is reciprocated by a cam 96 cooperating with a bearing 97 and driven by a flexible shaft 74 in a manner similar to the corresponding elements in the structure shown in Fig. 4.

A probe 98 is disposed substantially within the vent cutter portion 93 in a manner similar to the probe 60 shown in Fig. 4.

In this embodiment of the invention the cutting operation is performed in a manner generally similar to that described in connection with the embodiment illustrated in Figs. 1 to 5 except that the skin splitter being integral with the vent cutter is moved simultaneously with and in the same direction as the vent cutter when the latter is reciprocated by its driving mechanism.

Referring now to Figs. 8 to 11 inclusive, there is shown a cutter mechanism 100 generally similar to the cutter mechanism hereinbefore described except that the vent cutter is rotated instead of reciprocated. The cutter mechanism 100 includes a frame having a principal block 101 portion and bracket extending rearwardly therefrom. The block 101 is provided with an axially extending bore 103 in which a vent cutter 104 is rotatably supported, a bearing 101a preferably being provided for journaling the cutter 104. The cutter 104 includes a head 105 of generally tubular, cylindrical form having a forward, tapered and sharpened portion 106 which provides a peripherally continuous forward cutting edge of circular form. The head 105 is secured, as by threads 107, to a shank 108 which extends through and is guided in the bearing 105. The shank 108 is provided at its forward end with an enlargement 109 providing a shoulder adapted to seat against the forward end of the block 101 and thereby position and support the cutter 104 against rearward, longitudinal displacement. Mounted on the portion of the shank 108 which extends rearwardly of the block 101 is a spacer ring 110, a cam 111 which is secured thereon, as by a set screw 112, and a gear 113 which is secured on the shank, as by a set screw 114. The bracket 102 is provided with a bore 115 adapted to receive a flexible shaft sheath such as the sheath 75, above described containing the flexible shaft 74 which latter carries on its inner end a drive pinion 116 meshing with and driving the pulley 113.

It should be explained at this point that the cutter mechanism 100 is of such construction that it may be embodied as the cutter mechanism in the structure shown in Figs. 1 to 3 inclusive, instead of the cutter mechanism 39, and thus it may be driven by the flexible shaft 74 hereinbefore described. To this end, the cutter mechanism 100 preferably includes and is supported by a bar 344 similar to the bar 44 illustrated in Figs. 1 to 3 and described in connection therewith.

Disposed substantially within the cutter 104 is a probe 120 having a forward nose 121 and a dilator 122 provided with a tapered, generally conical surface 123. The nose 121 is disposed forwardly of the cutting edge 106 and the dilator is disposed substantially within the cylindrical cutter head 105. The probe 120 is held against rotation and against longitudinal displacement by a shank 124 which extends through and is spaced from the hollow shank 108 of the cutter and extends through and is secured, as by a set screw 126, in a post portion 125 of the bracket 102. The shank portion 124 may be formed integrally with the head portion of the probe but for convenience in manufacture it may be separately formed and secured thereto as by threads.

The cutter mechanism 100 is provided with a skin splitter blade 130 which preferably is generally similar to the blade 80 and is supported in the block 101 by a shank 131 in a generally similar manner and is urged toward retracted position by a spring 132, also in a generally similar manner. The blade 130 is reciprocated by the rotatable cam 111 which bears against a bearing 133 carried in the rear end of the shank 131. The cam 111 is rotated by the rotation of the shank 108 and thus the skin splitter blade 130 is reciprocated simultaneously with the rotation of the vent cutter blade 104.

This form of machine operates in a manner generally similar to the form above described in which the cutter mechanism is embodied. The cutter mechanism is driven by the flexible shaft 74 which rotates the drive pinion 116 to rotate the gear 113, which in turn rotates the shank 108 of the vent cutter 104. At the same time the cam 111 is rotated which effects reciprocation of the skin splitter 130. As the fowl carcass is moved into cutting relation with the cutter mechanism 100, the probe enters the vent and holds the vent and adjacent portion of the large intestine and the cutting edge of the rotating cutter blade 104 cuts the skin around the vent to sever the vent from the surrounding skin. At the same time the reciprocating skin splitter 130 cuts the skin from the vent cut close to the keel bone to thereby provide a rear opening into the visceral cavity of sufficient extent to permit removal of the viscera.

The machine, as above mentioned, may employ a rotating instead of a reciprocating skin splitter. This form of the invention is shown in Figs. 12 to 15 to which reference now is made.

The cutter mechanism 150 includes a frame which is generally similar to the frame of Fig. 4 and includes a block portion 152 supporting a vent cutter 153 similar in construction to the vent cutter 54 shown in Figs. 4 and 5 and above described. The vent cutter 153 is driven by a cam 154 from the flexible shaft 74 in a manner similar to that above described in connection with the cutter mechanism 39. A probe 155 which preferably is similar to the probe 60 and is supported in the same manner is provided and functions in the same manner as the probe 60.

The skin splitter takes the form of a disc-shaped blade 160 having its periphery tapered and sharpened to provide a cutting edge 161. The blade 160 is rotatably mounted by a shaft 162 journaled in a fork 163 rigidly secured to the block 152. The rotatable blade 160 is supported by the fork 163 in a position above the vent cutter 153 and in a vertical, medial, longitudinal plane through the vent cutter 153. The cutter 160 is spaced from the cutter 153 a slight distance sufficient to permit the necessary clearance between the blades.

The blade 160 is rotated by a flexible shaft 140 housed in a flexible sheath 141 and connected at one end to the shaft 162. The shaft 140 is driven by the motor 76, along with the flexible shaft 74, through a suitable dual drive 142.

The remainder of this machine illustrated in Fig. 12 is the same as the machine shown in Figs. 1 to 3.

The machine illustrated in Fig. 12 operates in a manner generally similar to the machine illustrated in Figs. 1 to 3 except that the skin splitter 160 is rotated by the motor 76 simultaneously with the reciprocation of the vent cutter 150. The vent cutter 153 and a probe 155 function in the same manner as described in connection with the vent cutter 54 and probe 60. The skin splitter 161 engages and cuts the skin from the vent cut to close to the keel bone by a rotating action, with the result that the fowl carcass is provided with a rear opening generally similar to that provided by the mechanism illustrated in Figs. 1 to 5 of the drawings.

Referring now to Fig. 15, there is illustrated a cutter mechanism 170 wherein both the vent cutter and skin splitter are rotated. The cutter mechanism 170 is so constructed that it may be substituted for the vent cutter 150 in the machine illustrated in Fig. 12 of the drawings.

The cutter mechanism 170 includes a suitable frame having a block portion 172 and a bracket 173. Rotatably supported in the block 172 is a vent cutter 174 having a head 175 formed with a peripherally continuous, tapered and sharpened edge 176 and a shank 177 which extends through and is journaled in a bore 178 in the block 172, a bearing 179 preferably being provided in the bore 178. Secured on the rearward, projecting end of the shank 177, as by a set screw 180, is a gear 181. A drive pinion 182 is secured, as by a set screw 183, on the end of the flexible shaft 74, the sheath 75 being suitably secured in the bracket 173.

A probe 184 is disposed substantially within the cutter blade 174 and is secured in the bracket 173 in a manner generally similar to the probe shown in Fig. 4. A skin splitter 190 which preferably is similar to the skin splitter 160 above described is rotatably supported in a similar manner and is rotatably driven by the flexible shaft 140.

The form of machine illustrated in Fig. 15 operates generally similar to the machine illustrated in Figs. 12 to 14 except that the venter is rotated instead of reciprocated. The resulting cuts, namely the vent cut and the skin splitting cut, are for all practical purposes the same as the cuts provided by the previously described forms of the machine.

The use of a fixed, nonrotating probe insures that the vent and adjacent portion of the large intestine will be held firmly and in proper position to permit the vent cut to be made without danger of damage to the vent or the adjacent portion of the large intestine or any of the other viscera. Since the probe is not rotated, the vent and the large intestine are not twisted and therefore there is no danger of damage to these portions of the carcass with the resultant likelihood of contamination by the intestinal contents. I have found that still further desirable results are obtained in positioning and holding the vent and adjacent portions of the intestine against the probe by applying a vacuum or suction to the vent and intestine into which the probe is inserted in a direction to draw the vent and intestine against the probe. This serves to hold the vent and large intestine close to the probe during the venting operation and insures against cutting into these portions of the carcass.

I have also found that it is desirable to wash the probe and vent cutter blade after each cutting operation in order to remove therefrom any intestinal contents which may have been deposited thereon during the previous cutting operation. Thus I insure that such contents do not contaminate the next carcass when the cutting blade cuts through the skin around the vent and tends to carry such adherent intestinal contents into the visceral cavity of the next carcass. To this end I project a light stream of water through the probe, which passes over the surface of the probe and the adjacent surfaces of the cutter and washes off the adherent intestinal contents. This water also serves to lubricate the probe and blade which facilitates entry of the probe into the vent and the cutting action of the blade on the skin surrounding the vent.

There is illustrated in Figs. 16 to 18 one form of machine embodying an arrangement for providing the aforementioned vacuum and washing water. While I have illustrated this feature of the invention in connection with the form of cutter mechanism shown in Figs. 1 to 5 inclusive, it will be understood that it may be embodied in any of the mechanisms heretofore described.

Referring now to Figs. 16 to 18, the machine is similar to that illustrated in Figs. 1 to 5 except in respect to the cutter mechanism 200 and the means for creating vacuum and supplying water. The cutter mechanism 200 includes probe 201 provided with a passage 202 which extends throughout the shank 203 and through the head 204 of the probe. The passage at its forward portion preferably is formed with a plurality of branches 205 which open through the forward conical surface of the probe in a plurality of circumferentially arranged orifices. Connected to the rear end of the shank 203 is a flexible hose 206 which is connected to a vacuum line 207 which in turn is connected to suitable vacuum means (not shown) for producing a suction or vacuum in the hose 206 and consequently in the passage 202. The hose 206 also is connected to a water line 208 which in turn is connected to a source (not shown) of water under a light pressure, whereby water may be passed through the hose 206 and the passage 202 in the probe 201.

The vacuum is applied to the passage 203 in the probe in timed relation to the entrance of the probe into the fowl carcass and the removal of the probe therefrom. Preferably the vacuum is applied at the time the probe has fully entered the vent and large intestine and the vacuum is held during the vent cutting operation and the removal of the probe, whereafter the vacuum is discontinued. The water is caused to pass through the passage in the probe after the probe and cutter have been removed from the carcass prior to insertion in the next carcass and, of course, after the vacuum has been cut off. To this end suitable valves 209 and 210 are provided in the vacuum and water lines respectively and are controlled by suitable timing mechanism (not shown) actuated in timed relation to the movement of the cutter mechanism and preferably actuated by the movement of the crank arm which drives the cutter mechanism 200, although it may be actuated by the conveyor.

I have found that it is desirable to employ a relatively slight pressure on the water sufficient only to flush off the adherent intestinal material. If the pressure of the water issuing from the orifices in the probe is too great, it tends to "balloon" the large intestine directly in back of the vent which not only creates a reservoir of water which tends to rush out very rapidly when the probe is removed from the vent, thereby causing the water to run out of the cut portions of the vented bird but also if the pressure is too great it will cause the intestine to break. Moreover, if the water pressure is sufficient to balloon the intestine the latter may be cut by the vent cutter when the latter enters the visceral cavity.

As hereinbefore indicated, I prefer to employ reciprocating or vibrating blades or knives both for performing the vent cut and for performing the skin splitting operation. The extent of the cutting movement of the blades is not critical and it is necessary only that the movement be sufficient to cut through the skin surrounding the vent and extending from the vent to the keel bone. It is important, however, that the extent of entry of the cutter blades into the carcass be limited so as not to cut into portions of the carcass other than the skin in which the cuts are to be made. The blades are reciprocated at a speed sufficient to provide a desirable cutting action and excellent results have been obtained by reciprocating the blades at a speed 100 times a minute, although this is not critical. In the case of rotating knives or cutter blades, the blades must, of course, penetrate the skin sufficiently to make the desired cuts but the extent of penetration beyond this is not critical except that, as in the case of the reciprocating blades, care should be taken that the blades do not cut into any portions of the carcass other than the skin in which the vent and skin cuts are to be made. Excellent results have been obtained by rotating the blades approximately 100 R. P. M. although this is not critical and the blades need to rotate at only sufficient speed to provide a desirable cutting action. In fact, where a rotating cutter is employed, it may be rotated at a speed of from around 10 R. P. M. to much higher speeds.

The invention relates to, and the cutter mechanism has been disclosed as embodied in, a machine wherein the fowl carcasses are moved into cutting relation with and past the cutter mechanism by automatic means and the cutter mechanism is moved into an out of cutting position automatically. However, the several forms of cutter mechanism herein disclosed may be employed in connection with the manual movement of the fowl carcasses into cutting relation with the cutter mechanism, or vice versa. That is to say, the cutting mechanism may be suitably supported and the fowl carcass manually moved into and out of cutting relation with the cutting mechanism.

From the foregoing it will be seen that the present invention provides a mechanism for venting poultry carcasses whereby the vent or cloaca is cut away from the surrounding skin in such manner that there is no damage to any other portion of the carcass, especially the large intestine and other viscera close to the vent. The vent and adjacent portion of the large intestine are positively held in position for the cutting operation but are not twisted or otherwise damaged. The mechanism also incorporates means for cutting or splitting the abdominal skin from the vent cut to adjacent to the keel bone at the same time that the vent cut is made, the abdominal skin cut also being made in such manner as not to damage any other portion of the carcass.

The mechanism of the present invention is suitable for and in accordance with the present invention is incorporated in a machine whereby the cutting and splitting operations are carried out in a fully automatic manner and without any manual operations. However, the cutter mechanism is adapted for fully manual operation or for partly manual and partly automatic operation if such is desired.

The machine of the present invention is simple in construction, easy and inexpensive to manufacture and is reliable in operation. There are relatively few parts and they may be made rugged and strong. Hence the machine requires a minimum of attention, servicing and repair and may be operated over long periods without shutdown.

The machine is complete and self-contained and may be operated, without auxiliary or supplemental apparatus, to perform the venting and splitting operations. On the other hand, the machine is excellently adapted for assembly with other poultry processing mechanisms as one component of a machine for performing other operations on the poultry carcass either prior to or after the venting and splitting operations.

I claim:

1. A machine for venting poultry carcasses comprising a support, a probe mounted on said support and fixed against rotation thereon, a generally cylindrical cutter blade movably mounted on said support in coaxial relation to said probe, and means drivingly connected to said blade for effecting a cutting movement thereof relatively to said support.

2. A machine for venting poultry carcasses comprising a support, a probe mounted on said support and fixed against rotation thereon, a generally cylindrical cutter blade rotatably mounted on said support in coaxial relation to said probe, and means drivingly connected to said blade for rotating the latter relatively to said support.

3. A machine for venting poultry carcasses comprising a support, a probe mounted on said support and fixed against rotation thereon, a generally cylindrical cutter blade slidably mounted on said support in coaxial relation to said probe, and means drivingly connected to said blade for reciprocating the latter relatively to said support.

4. A machine for venting poultry comprising a frame, a traveling conveyor mounted on said frame, means carried by said conveyor for attaching a poultry carcass thereto for movement therewith, a venting mechanism for cutting the vent of the carcass from the surrounding skin, means mounting said venting mechanism on said frame for movement into and out of the path of a carcass carried by said conveyor, and means on said frame actuated in timed relation to the movement of said conveyor for moving said venting mechanism into and out of cutting relation to a carcass carried by said conveyor.

5. A machine for venting poultry carcasses comprising a support, a probe mounted on said support and fixed against rotation thereon and having a face and a passage therein opening into the face of said probe, means connected to said passage for creating a vacuum in said passage, a generally cylindrical cutter blade movably mounted on said support in coaxial relation to said probe, and means drivingly connected to said blade for effecting a cutting movement thereof relatively to said support.

6. A machine for venting poultry carcasses comprising a support, a probe mounted on said support and fixed against rotation thereon and having a face and a passage therein opening into the face of said probe, means connected to said passage for passing a washing liquid through said passage, a generally cylindrical cutter blade movably mounted on said support in coaxial relation to said probe and means drivingly connected to said blade for effecting a cutting movement thereof relatively to said support.

7. A machine for venting poultry carcasses comprising a frame, a traveling conveyor on said frame, means carried by said conveyor for attaching a poultry carcass thereto for movement therewith, a venting mechanism mounted on said frame including a support, a probe mounted on said support and fixed against rotation thereon and having a face and a passage therein opening into the face of the probe, a generally cylindrical cutter blade movably mounted on said support in coaxial relation to said probe and means drivingly connected to said blade for effecting a cutting movement thereof relatively to said support, means connected to said support and actuated in timed relation to the movement of said conveyor for moving said venting mechanism into and out of the path of a carcass carried by said conveyor, and means connected to said passage and actuated in timed relation to the movement of said venting mechanism for applying a vacuum to said passage.

8. A machine for venting poultry carcasses comprising a frame a traveling conveyor on said frame, means carried by said conveyor for attaching a poultry carcass thereto for movement therewith, a venting mechanism mounted on said frame including a support, a probe mounted on said support and fixed against rotation thereon and having a face and a passage therein opening into the face of the probe, a generally cylindrical cutter blade movably mounted on said support in coaxial relation to said probe, and means drivingly connected to said blade for effecting a cutting movement thereof relatively to said support, and means connected to said support and actuated in timed relation to the movement of said conveyor for moving said venting mechanism into and out of cutting relation to a carcass on said conveyor, and means connected to said passage and actuated in timed relation to the movement of said venting mechanism for passing a washing liquid through said passage.

9. A machine for venting poultry carcasses comprising a traveling conveyor mounted on said frame, means carried by said conveyor for attaching a poultry carcass thereto for movement therewith, a venting mechanism mounted on said frame including a support, a probe mounted on said support and fixed against rotation thereon and having a face and a passage therein opening into the face of said probe, a generally cylindrical cutter blade movably mounted on said support in coaxial relation to said probe, and means drivingly connected to said blade for effecting a cutting movement thereof relatively to said support, means including a support mounting said venting mechanism on said frame for movement into and out of the path of a carcass carried by said conveyor and means connected to said support and actuated in timed relation to the movement of said conveyor for moving said venting mechanism into and out of cutting relation to a carcass on said conveyor, and means connected to said passage and actuated in timed relation to the movement of said venting mechanism for successively applying a vacuum to said passage and for passing a washing liquid through said passage.

10. A machine for venting poultry carcasses comprising a frame, a support mounted on said frame a venting mechanism mounted on said support for cutting the vent of the carcass from the surrounding skin including a probe mounted on said support and fixed against rotation thereon, a cutter blade mounted on said frame in coaxial arrangement with said probe, and means for imparting a cutting movement to said blade, and a conveyor mounted on said frame and extending past said cutter mechanism for moving a poultry carcass past said venting mechanism along a path whereby said probe enters the vent and said blade cuts the vent away from the surrounding skin.

11. A machine for venting poultry carcasses comprising a frame, a support on said frame, a venting mechanism mounted on said support for cutting the vent of the carcass from the surrounding skin including a probe mounted on said support and fixed against rotation thereon, a cutter blade disposed in coaxial arrangement with said probe, and means for imparting a cutting movement to said blade, a conveyor for moving a poultry carcass past said venting mechanism, and means on said frame for guiding the carcass along a path into a position wherein said probe enters the vent and said blade cuts the vent away from the surrounding skin, and then laterally away from said venting mechanism.

12. A machine for venting poultry carcasses comprising a frame, conveyor means on said frame for conveying poultry carcasses in succession along a predetermined path, and means on said frame actuated in timed relation to the movement of said conveyor for withdrawing the contents of the lower end of the intestinal tract of each said carcass.

13. A machine for venting poultry carcasses comprising a frame, a traveling conveyor mounted on said frame, means carried by said conveyor for attaching a poultry carcass thereto for movement therewith, a venting mechanism for cutting the vent of the carcass from the surrounding skin, means mounting said venting mechanism on said frame for swinging movement into and out of the path of a carcass carried by said conveyor and means actuated in timed relation to the movement of said conveyor for swinging said venting mechanism into and out of cutting relation to a carcass carried by said conveyor.

14. A machine for venting poultry carcasses comprising a frame, a traveling conveyor mounted on said frame, means carried by said conveyor for attaching a poultry carcass thereto for movement therewith, a venting mechanism for cutting the vent of the carcass from the surrounding skin, means mounting said venting mechanism on said frame for swinging movement into and out of the path of a carcass carried by said conveyor, means actuated in timed relation to the movement of said conveyor for swinging said venting mechanism into and out of cutting relation to a carcass carried by said conveyor, and means including a guide element extending longitudinally along the path of and adjacent said conveyor for guiding a carcass into position to be engaged by said venting mechanism.

15. A machine for venting poultry carcasses comprising a frame, a traveling conveyor mounted on said frame, means carried by said conveyor for attaching a poultry carcass thereto for movement therewith, a venting mechanism for cutting the vent of the carcass from the surrounding skin, means mounting said venting mechanism on said frame for movement into and out of the path of a carcass carried by said conveyor including a suspension arm pivoted on said frame, a bar pivoted on said arm and carrying said venting mechanism and a spring between said bar and said arm for yieldably opposing pivotal movement of said bar relatively to said arm upon engagement between a carcass and said venting mechanism, and means actuated in timed relation to the movement of said conveyor for swinging said arm to carry said venting mechanism into and out of cutting relation to a carcass carried by said conveyor.

16. A machine for venting poultry carcasses comprising a frame, a traveling conveyor mounted on said frame, means carried by said conveyor for attaching a poultry carcass thereto for movement therewith, a venting mechanism for cutting the vent of the carcass from the surrounding skin, means mounting said venting mechanism on said frame for movement into and out of the path of a carcass carried by said conveyor and means actuated by said conveyor for moving said venting mechanism into and out of cutting relation to a carcass carried by said conveyor.

References Cited in the file of this patent
UNITED STATES PATENTS

| | | |
|---|---|---|
| 1,798,585 | Bookheim | Mar. 31, 1931 |
| 1,943,077 | Jansen | Jan. 9, 1934 |
| 1,986,195 | Griffin | Jan. 1, 1935 |
| 2,590,785 | Nealy | Mar. 25, 1952 |